(12) United States Patent
Borghi

(10) Patent No.: US 7,975,501 B2
(45) Date of Patent: Jul. 12, 2011

(54) AIR CONDITIONING SYSTEM FOR A MOTOR VEHICLE

(75) Inventor: Gianni Borghi, Albinea (IT)

(73) Assignee: Lombardini S.R.L. a Socio Unico, Reggio Emilia (IT)

( * ) Notice: Subject to any disclaimer, the term of this patent is extended or adjusted under 35 U.S.C. 154(b) by 382 days.

(21) Appl. No.: 12/160,887

(22) PCT Filed: Jan. 13, 2006

(86) PCT No.: PCT/IT2006/000017
§ 371 (c)(1),
(2), (4) Date: Jul. 14, 2008

(87) PCT Pub. No.: WO2007/080610
PCT Pub. Date: Jul. 19, 2007

(65) Prior Publication Data
US 2010/0229578 A1    Sep. 16, 2010

(51) Int. Cl.
F25B 27/00 (2006.01)
B60H 1/32 (2006.01)
B60H 3/00 (2006.01)
B60H 1/00 (2006.01)

(52) U.S. Cl. ............ 62/323.1; 62/244; 165/42; 165/43; 165/202

(58) Field of Classification Search .............. 62/160, 62/323.1, 239, 244, 236, 196.4; 165/43, 165/42, 240, 202
See application file for complete search history.

(56) References Cited

U.S. PATENT DOCUMENTS

| 2001/0013409 | A1* | 8/2001 | Burk et al. ............ 165/240 |
| 2004/0123976 | A1* | 7/2004 | Horn et al. ............ 165/42 |
| 2005/0035657 | A1* | 2/2005 | Brummett et al. ...... 307/10.1 |
| 2005/0072553 | A1* | 4/2005 | Tigner et al. .......... 165/42 |
| 2005/0103487 | A1 | 5/2005 | Aflekt et al. |

FOREIGN PATENT DOCUMENTS

WO 03/000514 A1 1/2003
WO 2005/108133 A1 11/2005

* cited by examiner

Primary Examiner — Chen-Wen Jiang
(74) Attorney, Agent, or Firm — Browdy and Neimark, PLLC

(57) ABSTRACT

An auxiliary air conditioning system (7) for a motor vehicle (1), comprising a first heat exchanger (17) adapted to be installed inside a passenger compartment (4) of the motor vehicle and an external unit (43) comprising an auxiliary engine (8), an auxiliary compressor (12) driven by the auxiliary engine (8) and a second exchanger (17). The system comprises a switching valve (20) for selectively setting a first refrigerating cycle operating mode in which the first heat exchanger (17) serves as an evaporator and the second heat exchanger (14) serves as a condenser, and a second heat pump operating mode, in which the first heat exchanger (17) serves as a condenser and the fluid of the second heat exchanger (14) is cut off and the operative fluid is allowed to flow through a heating device (30) to receive thermal power independently from the outside environment temperature.

7 Claims, 2 Drawing Sheets

AIR CONDITIONING SYSTEM FOR A MOTOR VEHICLE

TECHNICAL FIELD

The present invention relates to an auxiliary air conditioning system for a motor vehicle, in particular for a truck passenger compartment.

BACKGROUND ART

Motor vehicles, and in particular trucks, are generally provided with an air conditioning system, hereinafter called "main", which comprises a compressor, a condenser, an expansion valve and an evaporator defining in a known way, a main refrigerating circuit in which a refrigerant liquid flows. The compressor is driven by the traction engine of the vehicle; therefore the engine must be kept running in order to operate the compressor also when parked. This is evidently a not very efficient engine use, with consequent excessive consumption and emission of polluting agents.

In order to solve the aforesaid problem, it has been proposed to use an auxiliary air conditioning system comprising an auxiliary thermal engine, of reduced power with respect to the traction engine, and an auxiliary refrigerating circuit comprising in turn an auxiliary compressor, condenser, expansion valve and evaporator. In this way, when parked, it is sufficient to keep the auxiliary engine running, which has reduced consumption with respect to the main traction engine, but which can also work in maximum efficiency conditions, thus minimising consumption and polluting emissions.

An auxiliary system of this type is disclosed in WO-A-05108133. This system is fully autonomous with respect to the main system and may work according to a refrigerating cycle to extract heat from the passenger compartment, and according to a reversed refrigerating cycle, i.e. as a heat pump, to warm the passenger compartment. The system conveniently comprises a heat exchanger installed inside the passenger compartment (hereinafter called "internal exchanger"), having the function of an evaporator in refrigerating cycle operation and of a condenser in heat pump operation, and an integrated external unit easily installable on the chassis of the vehicle, which groups together all the remaining refrigerating circuit components. In particular, such external unit comprises a second heat exchanger (hereinafter called "external exchanger") working as a condenser in refrigerating cycle operation and as an evaporator in heat pump operation.

In this operating mode, the drawback of ice forming on the external exchange occurs in the event of outside temperatures close to 0° C. To solve the aforesaid problem, the use of an electrical heater associated to the external exchanger has been proposed. This entails additional costs, more complex system and controls and a lower energy efficiency.

Another problem, typical of heat pumps, consists in the fact that as the outside temperature decreases so does the operative fluid temperature and therefore the thermal power that the internal exchanger can output into the passenger compartment.

DISCLOSURE OF INVENTION

It is the object of the present invention to provide an auxiliary air conditioning system which is free from the above-mentioned drawbacks related to the known units.

The aforesaid object is achieved by the present invention in that it relates to an auxiliary air conditioning system for a motor vehicle provided with a passenger compartment, comprising:

an internal unit installable in the passenger compartment and provided with a first heat exchanger; and an external unit installable on the motor vehicle outside said passenger compartment and comprising a second heat exchanger, an auxiliary compressor and an auxiliary engine for driving the auxiliary compressor, said heat exchangers and said compressor being part of a refrigerating circuit in which an operative fluid flows and comprising switching means for selectively setting a first refrigerating cycle operating mode, in which said first heat exchanger serves as an evaporator and said second heat exchanger serves as a condenser, and a second heat pump operating mode in which said first heat exchanger serves as a condenser; characterised in that said external unit comprises a heating device and circuit means for cutting out said second heat exchanger and for circulating the operative fluid through said heating device when said switching means are set in said heat pump operating mode.

According to a preferred embodiment of the invention, the heating device is an external heat exchanger using the exhaust gases of said auxiliary thermal engine as the auxiliary fluid.

BRIEF DESCRIPTION OF THE DRAWINGS

For a better understanding of the present invention, a preferred embodiment will now be described by way of non-limitative example, and with reference to the accompanying drawings, in which.

BEST MODE FOR CARRYING OUT THE INVENTION

Figure 1:
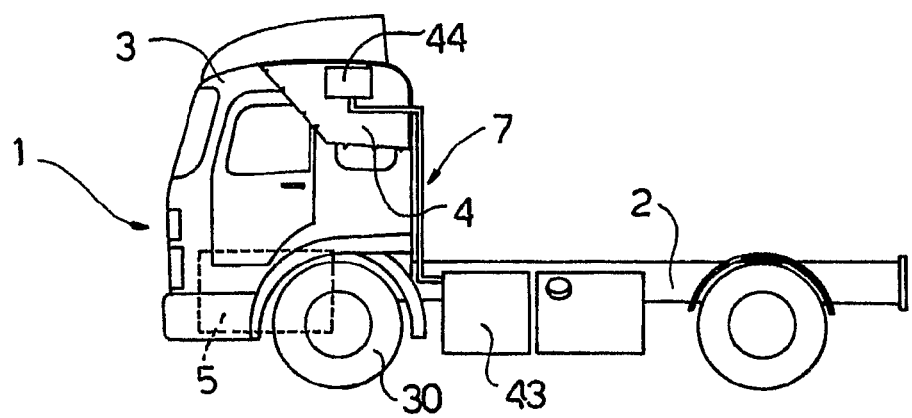
FIG. 1 is a schematic view, in side elevation, of a truck provided with an auxiliary air conditioning system according to the present invention.

With reference to FIG. 1, 1 indicates as a whole a truck provided with a chassis 2 and a driving cab 3 supported by the chassis 2 and provided with a passenger compartment 4.

The truck 1, which is described in extreme synthesis only for what needed to understand the present invention, comprises a main traction engine 5 supported by the chassis 2 and arranged underneath the passenger compartment 4, a main air conditioning system (not shown) of the cab 3 and an auxiliary air conditioning system 7.

Figure 2:
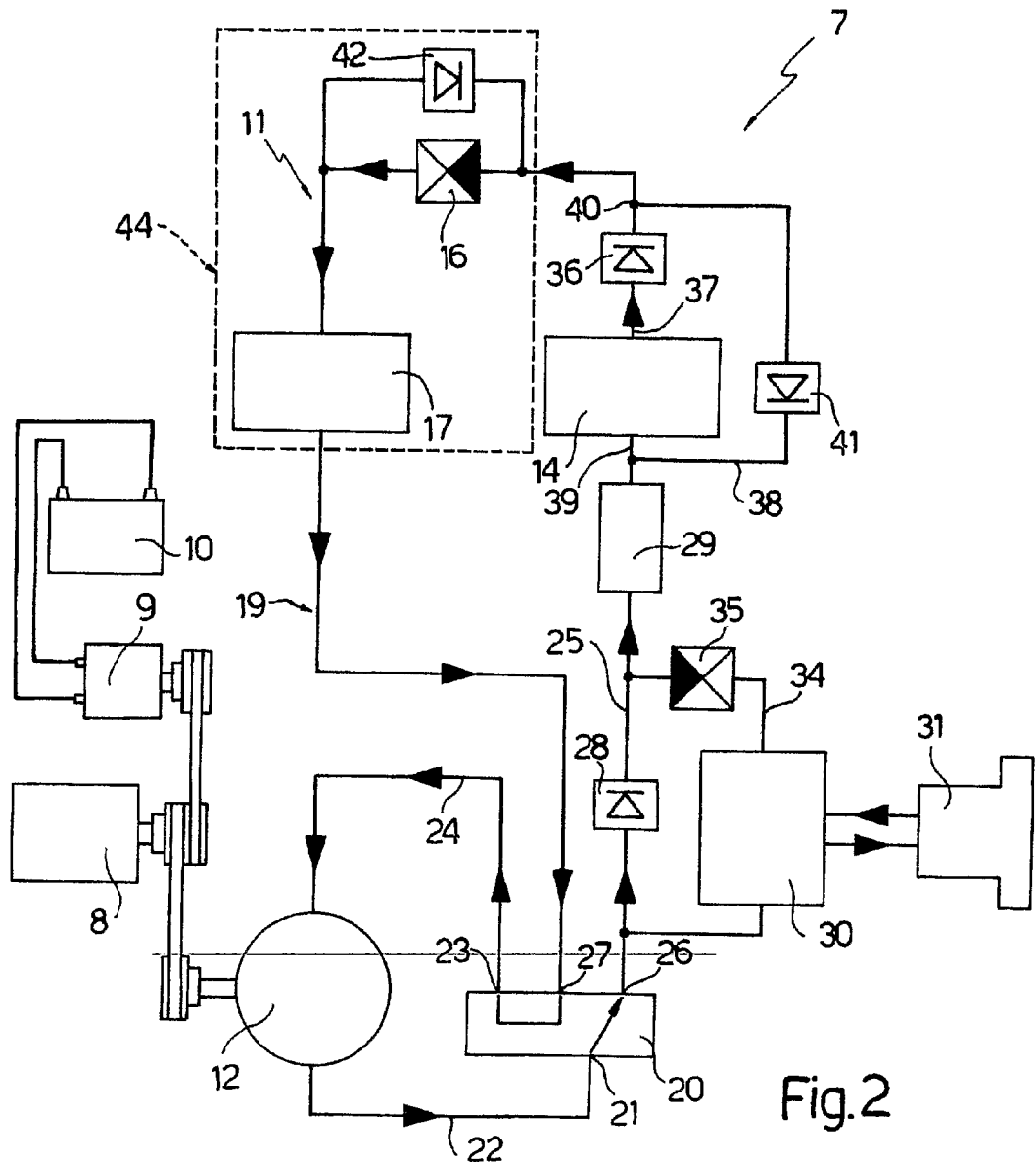
FIG. 2 is a diagram of the auxiliary air conditioning system of FIG. 1 in a first operating mode.

The auxiliary air conditioning system 7 (FIG. 2) essentially comprises an auxiliary engine 8, preferably of the Diesel type, an auxiliary alternator 9 driven by the auxiliary engine 8 and connected to an auxiliary battery 10, and a refrigerating circuit 11.

The refrigerating circuit 11 comprises a compressor 12 adapted to be driven by the auxiliary engine 8, a condenser 14, a throttle valve 16 and an evaporator 17 reciprocally arranged in a cascade to form a main closed circuit 19 in which a refrigerating fluid circulates. Respective electric fans, not shown, are conveniently associated to the condenser 14 and to the evaporator 17.

The cooling circuit 11 is conveniently of the reversible type, i.e. may work as a refrigerating circuit or as a heat pump, as better explained below.

For this purpose, the refrigerating circuit 11 further comprises a switching or cycle inversion valve 20 arranged between the compressor 12, the condenser 14 and the evaporator 17. More specifically, the valve 20 has an inlet 21 connected to a delivery pipe 22 of the compressor 12, and an outlet 23 connected to a suction pipe 24 of the compressor 12, and a pair of inlets/outlets 26, 27 connected to the condenser 14, and to the evaporator 17 respectively. Opening 26 is connected to the condenser 14 by means of a duct 25 on which a one-way valve 28, whose purpose will be described below, and a dryer filter 29 are conveniently located.

The refrigerating circuit 11 comprises a third heat exchanger 30 useable instead of the condenser 14 in heat pump operating mode. The heat exchanger 30 uses the auxiliary engine exhaust gases 8 as an auxiliary fluid, in thermal exchange with the refrigerant fluid, the auxiliary engine exhaust gases 8 and is for this purpose connected to the muffler 31 of the engine 8 (shown separately from the engine for the sake of graphic simplicity in the diagram, but physically connected to the engine 8 in actual fact).

The heat exchanger 30 is placed along a circuit branch 34 in parallel to the one-way valve 28, and is therefore connected between an opening 26 of the valve 20 and the dryer filter 29. A second throttle valve 35 is located on the circuit branch 34, between the heat exchanger 30 and the dryer filter 29; such one-way valve allows flow in the direction from the dryer filter 29 to the exchanger 30 only.

The circuit 11 comprises a one-way valve 36, located at the outlet 37 of the condenser 14, which is adapted to allow the flow from the condenser 14 to the throttle valve 16 but not the other way. A bypass line 38 connects the input 39 of the condenser 14 to the output 40 of the one-way valve 36 and is provided with a one-way valve 41 which allows flow from the throttle valve 16 to the dryer filter 29 only.

The throttle valve 16 is one-way and allows flow from the condenser 14 to the evaporator 17. A one-way valve 42 which allows the flow in direction out from the evaporator 17 is connected in parallel to the throttle valve 16.

The auxiliary air conditioning system 7 is split into an external unit 43, arranged externally to the cab 3, for example supported by the chassis 2, and an internal unit 44 arranged inside the passenger compartment 4 (FIG. 1).

The internal unit 44 comprises the evaporator 17 and the respective electric fan (not shown), the throttle valve 16 and the one-way valve 42; the external unit encloses all the remaining components of the refrigerating circuit 11, the auxiliary engine 8 and the auxiliary alternator 9.

The auxiliary system 7 is controlled by a conventional control unit, not shown, conveniently programmable by means of a remote control or a control panel integrated in the internal unit 44, by means of which it is possible to activate/deactivate the system, select the operating mode and set the desired temperature inside the passenger compartment.

In the refrigerating cycle operating mode (FIG. 2), the system works in a conventional manner. The switching valve 20 connects the compressor delivery to the condenser 14, through the one-way valve 28 and the dryer filter 29; from the condenser 14 the fluid passes, through the one-way valve 36, to the throttle valve 16 and from the latter to the evaporator 17, where it evaporates and subtracts heat from the environment (passenger compartment 4), and therefore returns to the compressor 12.

Figure 3:
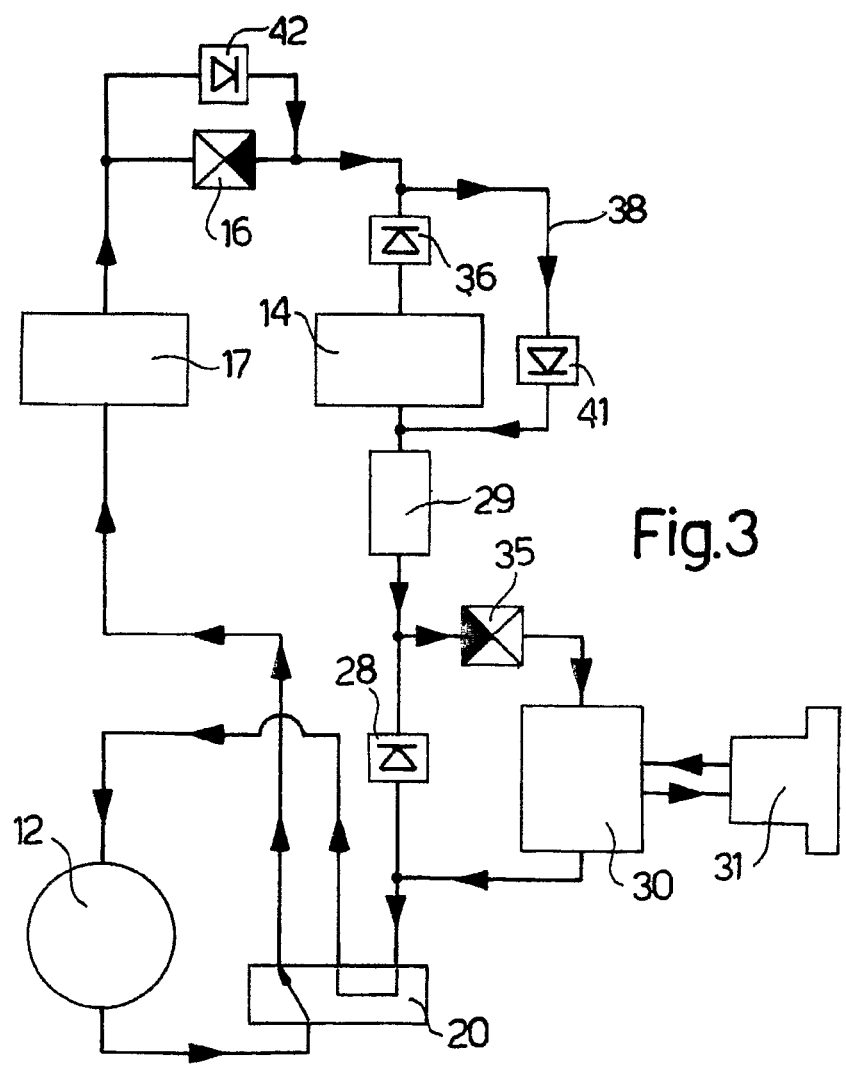
FIG. 3 is a diagram of an auxiliary air conditioning system of FIG. 1 in a second operating mode.

In heat pump operating mode (FIG. 3), the delivery of the compressor 12 is connected to the evaporator 17 (which in this case behaves as condenser). At output of the evaporator 17, the throttle valve 16 does not allow the passage of fluid, which instead flows through the one-way valve 42, the bypass line 38 and the dryer filter 29 to the exchanger 30. The exchanger 30 also performs the function of an evaporator; the refrigerant fluid receives energy from the exhaust gases and then returns to the compressor through the switching valve 20.

According to the present invention, in this operating mode, the "cold source" of the heat pump consists of the exhaust gases of the auxiliary engine 8, instead of the outside environment.

This allows to obtain numerous advantages. Firstly, the thermal power available for heating the passenger compartment 4 is independent from the outside environment temperature and is in all cases much higher than the power obtainable using the outside environment as cold source.

Secondly, the condenser of the refrigerating circuit is not crossed by fluid during heat pump operation; the risk of ice forming is thus eliminated at outside temperatures close to 0° C.

Changes and variations can be made to the example described without departing from the scope of protection of the invention as defined by the claims.

In particular, if the auxiliary engine 8 is water cooled, the cooling water can be used as an auxiliary fluid in the exchanger 30.

According to a further variant, less efficient from an energetic point of view, but much more convenient from the system design point of view, the exchanger 30 may be replaced by an electrical heater in which the thermal power is supplied by a resistor powered by an auxiliary generator 9. This solution, with respect to the possibility of installing an electrical heater directly in the passenger compartment, has the advantage of however exploiting the internal unit 44 for heating the passenger compartment 4, i.e. not requiring the installation of additional components in the passenger compartment.

The invention claimed is:

1. An auxiliary air conditioning system for a motor vehicle (1) provided with a passenger compartment (4), comprising:
   an internal unit (44) installable in the passenger compartment (4) and provided with a first heat exchanger (17); and an external unit (43) installable on the motor vehicle (1) outside said passenger compartment (4) and comprising a second heat exchanger (14), an auxiliary compressor (12) and an auxiliary engine (8) for driving the auxiliary compressor (12); said heat exchangers (14, 17) and said compressor (12) being part of a refrigerating circuit (11) in which an operative fluid flows and comprising switching means (20) for selectively setting:
   a first refrigerating cycle operating mode, in which said first heat exchanger (17) serves as an evaporator and said second heat exchanger (14) serves as a condenser, and
   a second heat pump operating mode in which said first heat exchanger (17) serves as a condenser;
   further comprising an auxiliary heat exchanger (30), and first circuit and valvolar means (38, 41) for cutting out said second heat exchanger (14) and for circulating the operative fluid through said auxiliary heat exchanger (30) when said switching means (20) are set in said heat pump operating mode and second circuit and valvolar means (25,28) for cutting out said auxiliary heat exchanger (30) and for circulating the operative fluid through said second heat exchanger (14) when said switching means (20) are set in said first refrigerating cycle operating mode, wherein said auxiliary heat exchanger (30) is connected to the auxiliary engine muffler (31) and uses the exhaust gases of said auxiliary engine (8) to heat the operative fluid.

2. A system according to claim 1, wherein said auxiliary heat exchanger (30) comprises an electrical heater.

3. A system according to claim 1, further comprising a first throttle valve (16) associated with said heat exchanger (17), said first throttle valve (16) being one-way valve for allowing the flow from said second heat exchanger (14) to said first heat exchanger (17).

4. A system according to claim 3, further comprising bypass means (42) for cutting out said first throttle valve (16) in said heat pump operating mode.

5. A system according to claim 1, further comprising a second throttle valve (35) associated to said auxiliary heat exchanger (30).

6. A system according to claim 5, wherein the second throttle valve (35) is one-way to allow the flow from said first heat exchanger (17) to said auxiliary heat exchanger (30).

7. A system according to claim 6, further comprising bypass means (28) for cutting out said second throttle valve (35) in said refrigerating cycle operating mode.

* * * * *